Patented Feb. 25, 1947

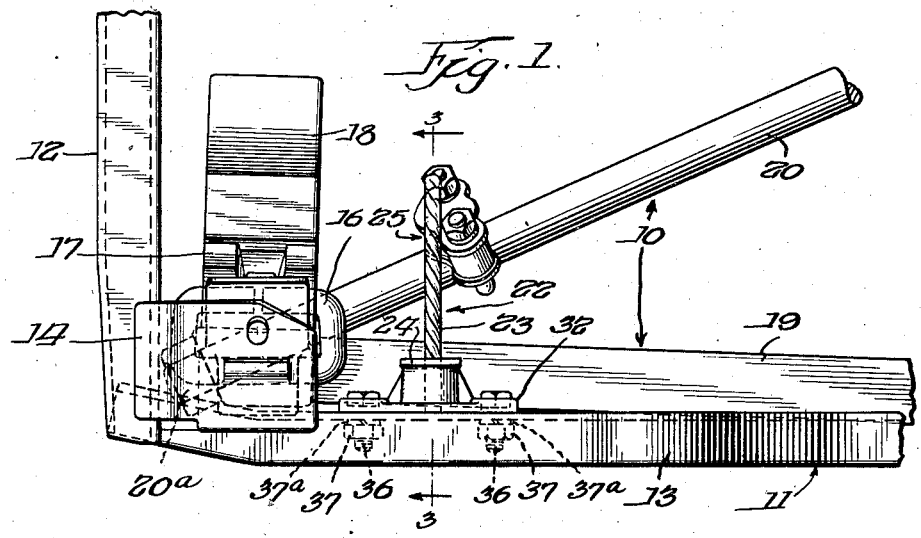
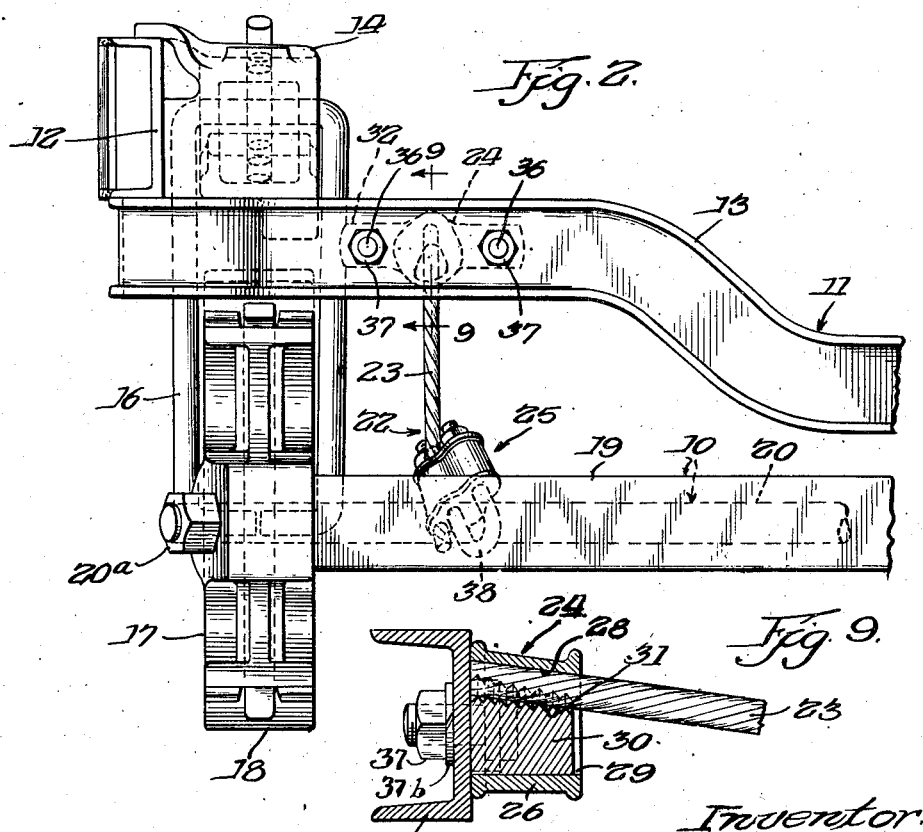

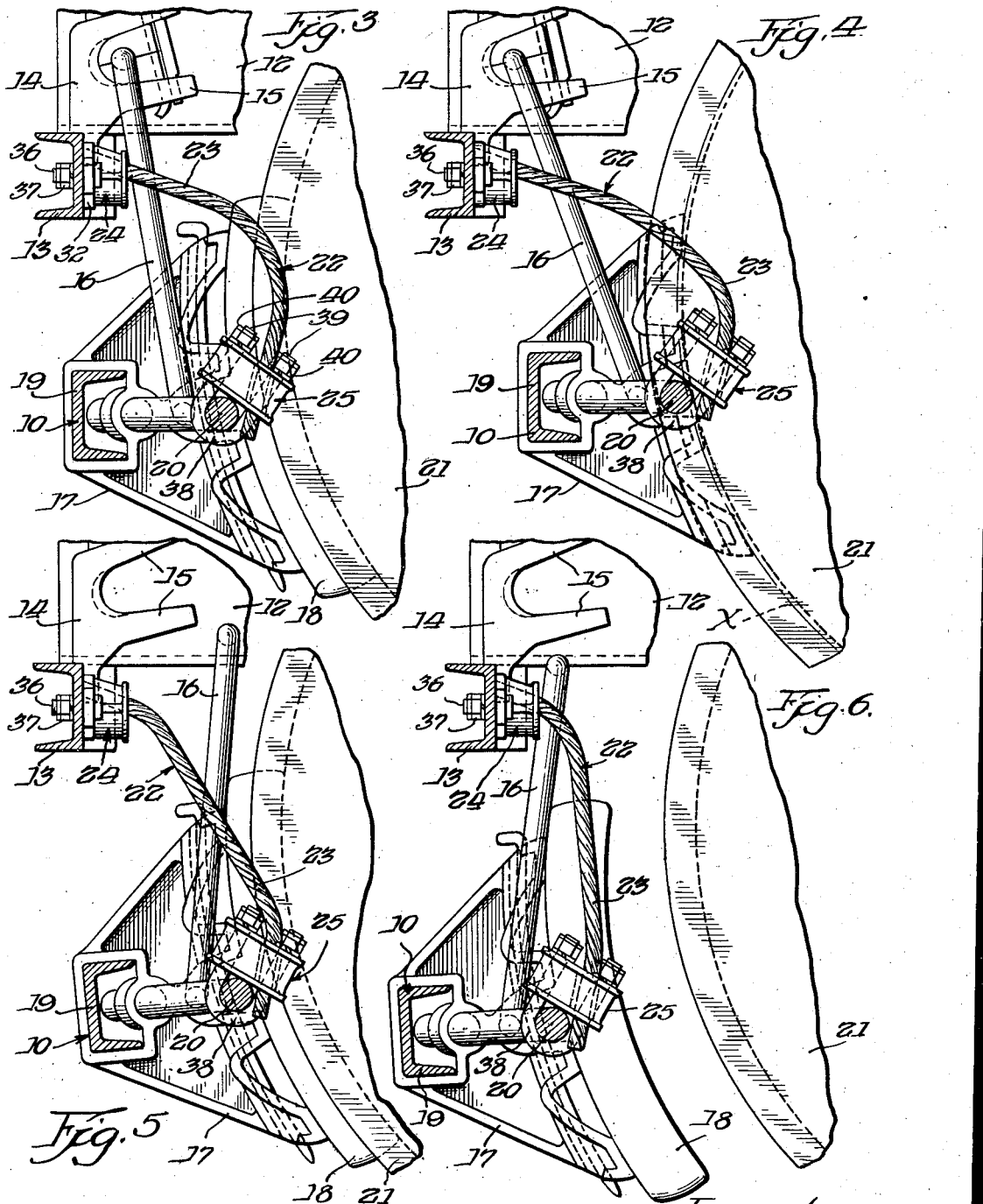

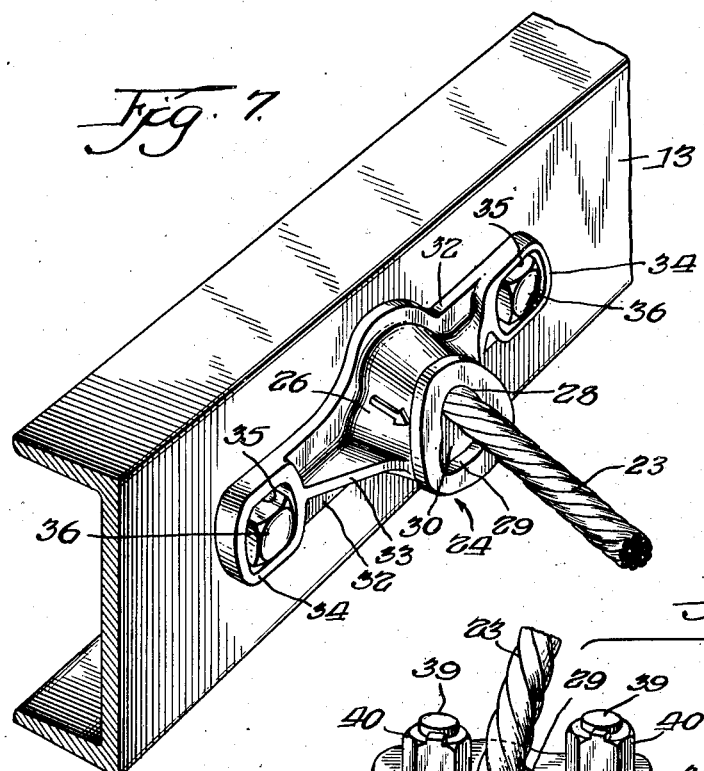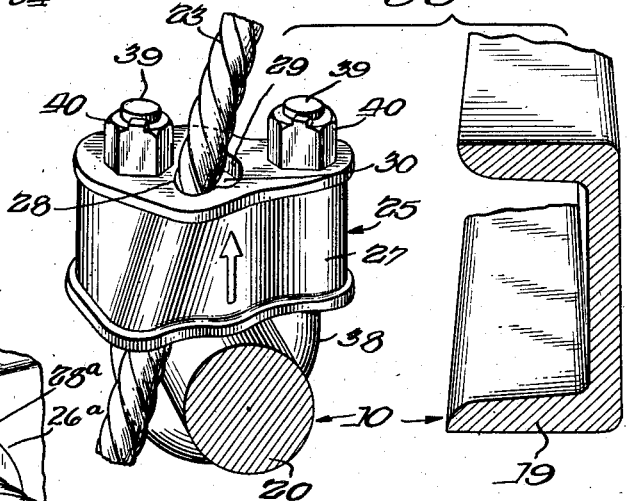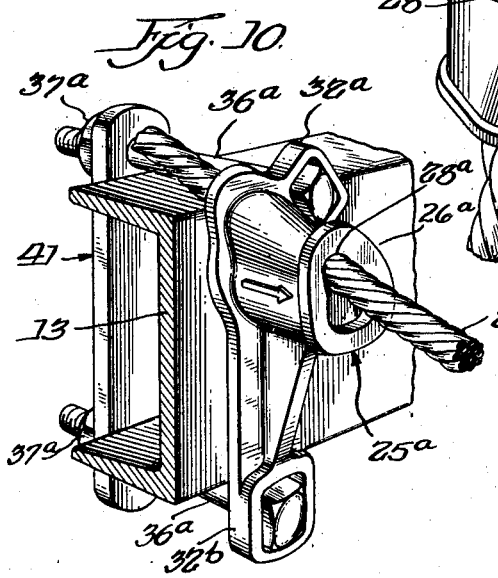

2,416,446

UNITED STATES PATENT OFFICE 2,416,446

BRAKE BEAM SAFETY SUPPORT

Lawrence W. Kass, Chicago, Ill., assignor to Grip Nut Company, Chicago, Ill., a corporation of Illinois Application April 26, 1944, Serial No. 532,308

10 Claims. (Cl. 188—210)

This invention relates to a brake beam safety support and more especially, it relates to safety supports capable of use in connection with brake mechanism in which the brakes are applied from the ends of the truck frame and toward each other or are applied in a direction outward from the interior of the truck, and one of the objects of this invention is the provision of a safety support which may be readily applied to the car truck and brake beams without the use of special tools.

Another object is the provision of a safety support for brake beams which is arranged to be secured to a frame member of the truck and to a member of the brake beam and arranged to permit normal functioning of the brake mechanism in case the brake shoe is worn away considerably, or in case the tread of the car wheel associated with said brake shoe is worn down.

Another object is the provision of a safety support arranged to be secured to an end frame member of the truck and to a member of the brake beam whereby to support an end of the brake beam in the event of failure of the brake hanger at that end of the brake beam.

Another object is the provision of a brake beam safety support which is arranged to be suspended from an end frame member of the truck and capable of supporting an end of the brake beam free and clear of the rail in case of failure of the brake hanger at that end, said support functioning to permit the application of the brakes in the usual manner.

A brake hanger may fail from many causes, one of which is failure at the brake hanger bracket. In accordance with the usual practice, the hanger is retained on the hanger bracket by a bolt, pin, wedges or the like, and when one of these securing means becomes loose and falls out of place, it releases the wear plates for the hanger, and they fall out of the hanger bracket, permitting the hanger to become disconnected from the hanger bracket and allowing that end of the brake beam to fall; and one of the objects of this invention is to secure the upper end of a safety support, cable, or other supporting member to an end frame member of the car truck, whereby there is no likelihood of the cable becoming disconnected from its support.

Another object of the present invention is the provision of the safety support for brake beams that can be easily and properly applied, without the necessity of using equipment or tools that are not always at hand in the field, to any type of railway trucks, regardless of the variations in dimensions that are prevalent in the trucks actually in use; whereby the stocking of many sizes and kinds of safety supports may be avoided, the application of the safety support may be simplified and adjustment made in the field, when the use of the support makes this desirable, by relatively unskilled workers capable of handling a simple wrench as a tool.

With these and other objects and advantages in view, this invention consists in the several novel features of construction, arrangement and combination of parts hereinafter fully set forth and claimed.

This invention is clearly illustrated in the drawings accompanying this specification in which:

Fig. 1 is a plan of one corner of the frame of a car truck, illustrating a simple form of the present invention applied thereto and providing a safety support for a brake beam;

Fig. 2 is an end elevation of the parts seen in Fig. 1;

Fig. 3 is a vertical cross-section taken on the line 3—3 of Fig. 1 and showing the brake applied against a car wheel;

Fig. 4 is a view similar to Fig. 3, but showing the brake shoe worn away and the tread of the car wheel worn down;

Fig. 5 is a view similar to Fig. 3 showing the brake applied to the car wheel as it appears when a brake hanger has failed;

Fig. 6 is a view similar to Fig. 5, but showing the brakes released;

Fig. 7 is a perspective view of the upper cable gripping member showing it secured upon an end frame member of a truck;

Fig. 8 is a perspective view of the lower cable gripping member and a fragment of the associated brake members of a brake beam;

Fig. 9 is a detail longitudinal section taken on the line 9—9 of Fig. 2, through the body of the upper cable gripping member; and Fig. 10 is a perspective view of a modified form of an upper cable gripping member showing the same applied to an end frame member of the truck.

Referring to said drawings, and first to Figs. 1 to 9 inclusive, the reference character 11 designates a fragment of a rectangular frame of a car truck from which the brake beams and associated parts are suspended. The frame 11 comprises longitudinal side frame members, one of which is shown at 12, and end frame members, one of which is shown at 13. These frame members are usually of channel construction and are welded together at the corners or otherwise rigidly fastened together. As here shown, a brake hanger bracket 14 is welded to the frame 11 at the corners where the brake hangers are located, and is formed with a forked member 15 in which the upper end of the associated brake hanger 16 is pivotally suspended in the conventional manner. The brake hanger is here shown as of the closed loop or link formation with its lower end extending through one of the grooves in the brake head 17 and held in place therein by the brake shoe 18 in the conventional manner.

The brake beam 10 may comprise the usual compression bar 19 and tension rod 20 secured upon the brake heads 17 at the ends of the compression bar as by nuts 20a. A conventional braking mechanism (not shown) is connected with the brake beam for applying the brakes to the car wheels, a fragment of one of which is shown at 21. The brake heads 17 are rigidly mounted upon the compression bar 19 of the brake beam, and the latter, together with the brake heads and brake shoes, are normally suspended from the brake hanger brackets by the hangers 16.

The safety support forming the subject matter of this specification is illustrated as a whole at 22. In accordance with its preferred form, the safety support comprises a non-rigid supporting member such as a semi-rigid cable 23 capable of flexing when subjected to severe strain, and the upper end of said cable is rigidly secured in a cable gripping member 24 that is bolted or otherwise secured to one side of the end frame member 13. The lower end of the cable is rigidly secured in a second cable gripping member 25 fastened upon a member of the brake beam.

In general, each cable gripping member comprises a body 26 or 27 (see Figs. 7, 8 and 9) having a transversely and obliquely extending opening 28 therein for the reception of an end portion of the cable, said opening being flanked by a larger opening 29 on one side, in which is contained a wedge block 30 that impinges upon a wall of the opening 29 and upon the cable and is preferably formed with teeth 31 that bite into the cable and effectively anchor it to the cable gripping member.

A more complete description and illustration of the body and wedge block is contained in my co-pending application for patent on Safety support for brake beam, Serial No. 461,538, filed October 10, 1942, now Patent No. 2,364,221, dated December 5, 1944, to which reference may be had for a fuller understanding of its construction. The exact means for anchoring the cable in either cable gripping member is immaterial so far as this specification is concerned but the one disclosed in my said co-pending application will suffice for the present disclosure.

The upper cable gripping member is formed with two oppositely disposed radially extending arms 32 (see Fig. 7) reinforced by ribs 33 which radiate from the body 26 and extend to points adjacent the ends of the arms where said arms are thickened somewhat as at 34, and are formed with recesses 35 therein to receive the heads of bolts 36. The side walls of the recesses are non-circular and serve to prevent rotation of the bolts. The latter extend through apertures in the bottoms of the recesses, extend through bolt holes in the upright web of the end frame member 13 and have nuts 37 threaded upon their ends that bear against the opposite side of the end frame member or against interposed lock washers 37b and rigidly secure the cable gripping member to end frame member.

The lower cable gripping member 25 may be secured to the tension rod 20 of the brake beam by a U-bolt 38 (see Fig. 8) as shown and described in my aforesaid co-pending application. The bend of the U-bolt extends around the tension rod 20 and its two legs 39 extend through holes in the body 27 of the cable gripping member and have nuts 40 threaded upon their upper ends which, when tightened up, clamp the tension rod firmly between the bend of the U-bolt and the lower end face of the body. Obviously, other equivalent means may be provided for clamping the body of the lower cable gripping member to the brake beam.

The cable extends from the upper cable gripping member in a downwardly sloping direction and passes through the lower cable gripping member in a substantially vertical direction and, under normal conditions, with the brakes applied, the cable is bent intermediate its ends into a bowed or arcuate shape, as seen in Fig. 3. This is the normal condition of the cable under ordinary circumstances with the brakes applied and without any appreciable wear upon the brake shoe or car wheel.

In the event that the brake shoe is worn down or if the wheel is worn down, then with the brakes applied, the cable will be straightened out somewhat as is seen in Fig. 4. For this reason, when equipping a car with the present safety support, the cable should be made of sufficient length and its lower end so adjusted in the lower cable gripping member, that in case of an extreme condition, as seen in Fig. 4, there will be sufficient length of cable to enable the brakes to be applied with some slack left in the cable. The dot and dash line X in this figure indicates the original tread line of the wheel.

In the event that the brake hanger becomes broken or is torn loose from its brake hanger bracket, or for any other failure of the brake hanger, then that end of the brake beam where the hanger has failed becomes suspended by the safety support and when the brakes are applied, the parts assume the position seen in Fig. 5 in which the cable has been straightened out somewhat and depends from the upper cable gripping member in a more nearly vertical direction, the brake beam, brake heads and brake shoes being suspended a considerable distance above the rails, whereby no damage is likely to come to them, with no likelihood of derailment.

If either brake hanger fails and the brakes are released, the associated safety support will still suspend the adjacent end of the brake beam and its brake head and brake shoe from the upper cable gripping member free and clear of the rail. This extreme position of the parts due to the failure of a brake hanger with the brakes released is seen in Fig. 6.

In the modified form of upper cable gripping member 25a seen in Fig. 10, two angularly disposed arms 32a, 32b project radially from the body 26a of the cable gripping member, the arm 32a extending upwardly in an oblique direction and the arm 32b extending downwardly.

This form of upper cable gripping member is intended for use in connection with end frame members where the desideratum is to eliminate bolt holes therein for the bolts, and consequently the apertures in the arms 32a, 32b for the bolts are located one immediately above and one immediately below the end frame member 13 so that the bolts may extend one above and one below said end frame member. For fastening the cable gripping member 25a upon the end frame member, an apertured bar 41 is provided which is placed against the edges of the flanges of the end frame member and the bolts 36a are passed through the apertures in the bar, the nuts 37a placed upon the bolts and screwed up tightly against the bar. The end of the passage or opening 28a in the body 26a adjacent the end frame member 13 is disposed above the top face of said frame member, which permits the end of the cable to protrude from that end of the body. With this arrangement, the cable can be adjusted relative to the body, so as to increase or decrease its length between the two cable gripping members.

From the above it is apparent that a very useful and efficient safety support has been provided which can be readily installed without use of special tools. Where the preferred form of upper cable gripping member is used, the end frame member must be drilled. Except for this operation, a wrench is the only tool required to install the safety support, and when the form of upper cable gripping member shown in Fig. 10 is used, it is unnecessary to drill the end frame member for the bolts. Furthermore, each safety support is always ready to support an end of a brake beam in case of failure of the brake hanger at that end of the brake beam. Moreover, the safety support does not interfere with the proper functioning of the brake hanger or the remainder of the brake mechanism.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. A brake beam safety support comprising a semi-rigid cable capable of flexing when subjected to severe strain, an upper cable gripping body member having radially extending apertured arms through which bolts may be passed to secure the upper gripping body member upon a frame member of a truck, said body member having an opening therethrough in which one end of the cable is received, a wedge block in said opening bearing against a wall thereof and against the cable, and a second cable gripping member adjustably secured upon the other end of the cable and having fastening means whereby to secure the same to a brake beam member.

2. A brake beam safety support comprising a semi-rigid cable capable of flexing when subjected to severe strain, an upper cable gripping body member having oppositely directed radially extending apertured arms through which bolts may be passed to secure the gripping body member upon a frame member of a truck, said body member having an opening therethrough in which one end of the cable is received, a wedge block in said opening bearing against a wall thereof and against the cable, and a second cable gripping member adjustably secured upon the other end of the cable and having fastening means whereby to fixedly secure the same to a brake beam member.

3. A brake beam safety support comprising a semi-rigid cable capable of flexing when subjected to severe strain, an upper cable gripping member having angularly disposed radially extending apertured arms through which bolts may be passed above and below a truck frame member, an apertured bar on the opposite side of said frame member through which said bolts extend and nuts threaded on said bolts and bearing against said bar to rigidly secure the gripping member upon said frame member, and a second cable gripping member adjustably secured upon the other end of the cable and having fastening means whereby to secure the same upon a brake beam member.

4. A brake beam safety support comprising a semi-rigid cable capable of flexing when subjected to severe strain, a cable gripping body member having radially extending apertured arms through which bolts may be passed to secure the cable gripping body member upon a frame member of a truck, said body member having an opening therethrough in which one end of the cable is received, a wedge block in said body bearing against a wall thereof and against the cable, and a second cable gripping member adjustably secured upon the other end of the cable and having a U-bolt arranged to extend through the body of the second named cable gripping member with the tension rod of a brake beam fixedly secured between the bend of the U-bolt and one end face of the body of the second named cable gripping member.

5. A brake beam safety support comprising a semi-rigid cable capable of flexing when subjected to severe strain, a cable gripping body member having angularly disposed radially extending apertured arms through which bolts may be passed to secure the gripping body member upon a frame member of a truck, said body member having an opening therethrough in which one end of the cable is received, a wedge block in said opening bearing against a wall thereof and against the cable, and a second cable gripping member adjustably secured upon the other end of the cable and having fastening means whereby to fixedly secure said second named gripping member to a brake beam member.

6. A brake beam safety support comprising a semi-rigid cable capable of flexing when subjected to severe strains, a cable gripping member having means for securing the same upon one side of an end frame member of a truck frame, said gripping member having a passage therethrough extending transversely thereof and terminating at one end above the plane of said end frame member of the truck frame whereby an end of the cable may protrude beyond the rear end of the gripping member, a wedge block in said gripping member in wedging engagement with the cable, and said cable being adjustable in said gripping member, and a lower cable gripping member adjustably secured upon the other end of the cable and having a U-bolt arranged to extend through the lower cable gripping member with the tension rod of a brake beam secured between the bend of the U-bolt and one end face of said lower cable gripping member.

7. A brake beam safety support comprising a semi-rigid cable capable of flexing when subjected to severe strains, an upper cable gripping body having supporting arms rigidly secured to an end frame member of a truck, and a lower cable gripping body having a U-bolt with its legs extending through said body with the tension rod of a brake beam clamped between the bend of the U-bolt and an end face of the body, each cable gripping body having a passage therethrough for the reception of an end of the cable and having also a tapered hole flanking said passage, and a wedge block seated in said hole in gripping engagement with the cable.

8. A brake beam safety support comprising a semi-rigid cable capable of flexing when subjected to severe strains, an upper cable gripping body having supporting arms rigidly secured to an end frame member of a car truck, and a lower cable gripping body having a U-bolt with its legs extending through said body with a tension rod of a brake beam clamped between the bend of the U-bolt and an end face of the body, each of the cable gripping bodies having a passage therethrough for the reception of an end of the cable and having a tapered hole flanking said passage, and a wedge block seated in said hole with one face contiguous with said cable, said face having teeth thereon impinged against the cable.

9. In a brake beam safety support, the combination of a semi-rigid cable capable of flexing when subjected to severe strain, and upper and lower cable gripping body members, one on each end of the cable, each body member having an opening therethrough for receiving an end of the cable, a wedge block in said opening bearing against a wall thereof and against the cable, the upper cable gripping member having a cable gripping body provided with arms whereby to rigidly secure the same to an end frame member of a car truck and the other having means to secure the same to the tension rod of a brake beam.

10. A brake beam safety support for car trucks comprising a semi-rigid cable, a cable gripping body member arranged to be bolted to a member of a truck frame, said body member having a tapered opening therethrough for receiving an end of the cable, a tapered wedge block in said opening bearing against a wall thereof and against the cable, and a second cable gripping body member having a tapered opening therein through which the other end of the cable extends, a tapered wedge block in said opening bearing against a wall thereof and against the cable, and a U-bolt extending around the tension rod of a brake beam and extending through the second named cable gripping member, and having nuts threaded upon its ends for fixedly securing the second named cable gripping member to said tension rod.

LAWRENCE W. KASS.

REFERENCES CITED

The following references are of record in the file of this patent:

UNITED STATES PATENTS

| Number | Name | Date |
| --- | --- | --- |
| 2,232,576 | Webb | Feb. 18, 1941 |
| 2,356,018 | Van Sweringen | Aug. 15, 1944 |
| 2,296,567 | Nielsen | Sept. 22, 1942 |
| 1,453,706 | Crosby | May 1, 1923 |
| 2,234,029 | Heckendorf | Mar. 4, 1941 |